United States Patent
Lee et al.

(10) Patent No.: US 7,301,717 B1
(45) Date of Patent: Nov. 27, 2007

(54) SERVO WRITING A DISK DRIVE BY INTEGRATING A SPIRAL TRACK READ SIGNAL

(75) Inventors: Tehri S. Lee, San Jose, CA (US); Siri S. Weerasooriya, Campbell, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 226 days.

(21) Appl. No.: 11/018,554

(22) Filed: Dec. 20, 2004

Related U.S. Application Data

(62) Division of application No. 10/903,522, filed on Jul. 30, 2004, now Pat. No. 7,248,426.

(51) Int. Cl.
*G11B 5/09* (2006.01)

(52) U.S. Cl. .......................................... 360/51; 360/75

(58) Field of Classification Search ...................... None
See application file for complete search history.

(56) References Cited

U.S. PATENT DOCUMENTS

| | | | |
|---|---|---|---|
| 5,576,906 A | 11/1996 | Fisher et al. | |
| 5,668,679 A | 9/1997 | Swearingen et al. | |
| 5,754,352 A | 5/1998 | Behrens et al. | |
| 6,091,564 A | 7/2000 | Codilian et al. | |
| 6,191,906 B1 | 2/2001 | Buch | |
| 6,292,318 B1 | 9/2001 | Hayashi | |
| 6,304,407 B1 | 10/2001 | Baker et al. | |
| 6,411,453 B1 | 6/2002 | Chainer et al. | |
| 6,429,989 B1 | 8/2002 | Schultz et al. | |
| 6,507,450 B1 | 1/2003 | Elliott | |
| 6,519,107 B1 | 2/2003 | Ehrlich et al. | |
| 6,587,293 B1 | 7/2003 | Ding et al. | |
| 6,704,156 B1 | 3/2004 | Baker et al. | |
| 6,738,205 B1 | 5/2004 | Moran et al. | |
| 6,943,978 B1 * | 9/2005 | Lee .............................. | 390/75 |
| 6,965,489 B1 * | 11/2005 | Lee et al. ...................... | 360/75 |
| 6,967,799 B1 * | 11/2005 | Lee .............................. | 360/51 |
| 6,985,316 B1 | 1/2006 | Liikanen et al. | |
| 6,987,636 B1 * | 1/2006 | Chue et al. .................... | 360/75 |
| 6,989,954 B1 * | 1/2006 | Lee et al. ...................... | 360/75 |
| 7,002,761 B1 | 2/2006 | Sutardja et al. | |
| 7,054,083 B2 | 5/2006 | Ehrlich | |
| 7,088,533 B1 | 8/2006 | Sheperd et al. | |
| 2006/0007585 A1 | 1/2006 | Ehrlich et al. | |
| 2006/0103967 A1 | 5/2006 | Kim et al. | |
| 2006/0171059 A1 | 8/2006 | Chan et al. | |

\* cited by examiner

*Primary Examiner*—Andrea Wellington
*Assistant Examiner*—Varsha A. Kapadia
(74) *Attorney, Agent, or Firm*—Howard H. Sheerin, Esq.

(57) ABSTRACT

A method of writing product servo sectors to a disk of a disk drive is disclosed. The disk comprises a plurality of spiral tracks, wherein each spiral track comprises a high frequency signal interrupted by a sync mark at a sync mark interval. The head internal to the disk drive is used to read the spiral tracks to generate a read signal. The read signal is integrated to generate a ramp signal, wherein a position error signal is generated from the ramp signal. The position error signal is used to maintain the head internal to the disk drive along a servo track while writing product servo sectors along the servo track.

14 Claims, 10 Drawing Sheets

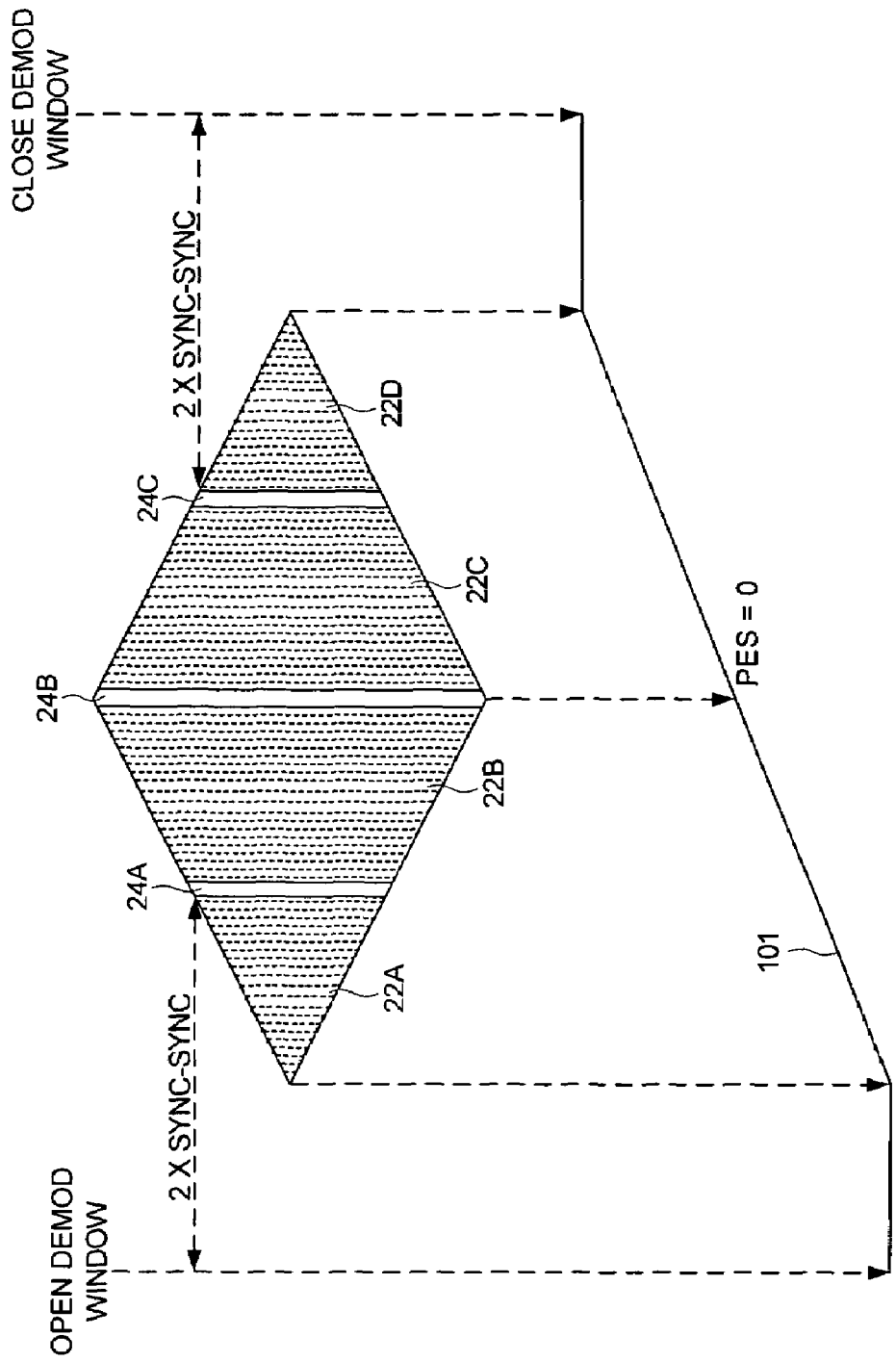

SERVO WRITING A DISK DRIVE BY INTEGRATING A SPIRAL TRACK READ SIGNAL

This application is a divisional of U.S. patent application Ser. No. 10/903,522 filed on Jul. 30, 2004 now U.S. Pat. No. 7,248,426, the disclosure of which is incorporated herein by reference.

BACKGROUND OF THE INVENTION

1. Field of the Invention

The present invention relates to disk drives for computer systems. More particularly, the present invention relates to servo writing a disk drive by integrating a spiral track read signal.

2. Description of the Prior Art

When manufacturing a disk drive, servo sectors $2_0$-$2_N$ are written to a disk 4 which define a plurality of radially-spaced, concentric data tracks 6 as shown in the prior art disk format of FIG. 1. Each data track 6 is partitioned into a plurality of data sectors wherein the servo sectors $2_0$-$2_N$ are considered "embedded" in the data sectors. Each servo sector (e.g., servo sector $2_4$) comprises a preamble 8 for synchronizing gain control and timing recovery, a sync mark 10 for synchronizing to a data field 12 comprising coarse head positioning information such as a track number, and servo bursts 14 which provide fine head positioning information. The coarse head position information is processed to position a head over a target track during a seek operation, and the servo bursts 14 are processed to maintain the head over a centerline of the target track while writing or reading data during a tracking operation.

In the past, external servo writers have been used to write the product servo sectors $2_0$-$2_N$ to the disk surface during manufacturing. External servo writers employ extremely accurate head positioning mechanics, such as a laser interferometer, to ensure the product servo sectors $2_0$-$2_N$ are written at the proper radial location from the outer diameter of the disk to the inner diameter of the disk. However, external servo writers are expensive and require a clean room environment so that a head positioning pin can be inserted into the head disk assembly (HDA) without contaminating the disk. Thus, external servo writers have become an expensive bottleneck in the disk drive manufacturing process.

The prior art has suggested various "self-servo" writing methods wherein the internal electronics of the disk drive are used to write the product servo sectors independent of an external servo writer. For example, U.S. Pat. No. 5,668,679 teaches a disk drive which performs a self-servo writing operation by writing a plurality of spiral tracks to the disk which are then processed to write the product servo sectors along a circular path. Each spiral track is written to the disk as a high frequency signal (with missing bits), wherein the position error signal (PES) for tracking is generated relative to time shifts in the detected location of the spiral tracks. The read signal is rectified and low passed filtered to generate a triangular envelope signal representing a spiral track crossing, wherein the location of the spiral track is detected by detecting a peak in the triangular envelope signal relative to a clock synchronized to the rotation of the disk. However, generating the PES by detecting a peak in a triangular envelope signal representing a track crossing is susceptible to signal noise leading to tracking errors and corresponding errors in the product servo sectors.

There is, therefore, a need to reduce tracking errors when servo writing a disk drive from prewritten spiral tracks.

SUMMARY OF THE INVENTION

The present invention may be regarded as a method of writing product servo sectors to a disk of a disk drive. The disk drive comprises control circuitry and a head disk assembly (HDA) comprising the disk, an actuator arm, a head coupled to a distal end of the actuator arm, and a voice coil motor for rotating the actuator arm about a pivot to position the head radially over the disk. The disk comprises a plurality of spiral tracks, wherein each spiral track comprises a high frequency signal interrupted by a sync mark at a sync mark interval. The head internal to the disk drive is used to read the spiral tracks to generate a read signal. The read signal is integrated to generate a ramp signal, wherein a position error signal is generated from the ramp signal. The position error signal is used to maintain the head internal to the disk drive along a servo track while writing product servo sectors along the servo track.

In one embodiment, the position error signal is generated relative to a target sync mark in a spiral track and a reference point of the ramp signal. In one embodiment, the position error signal is generated relative to a difference between a target amplitude at the reference point of the ramp signal and an actual amplitude of the ramp signal when the target sync mark is detected. In another embodiment, the position error signal is generated relative to a difference in time between when the target sync mark is detected and when the reference point of the ramp signal is detected.

In another embodiment, the read signal is processed to detect the sync marks in the spiral tracks in order to synchronize a servo write clock. In one embodiment, the servo write clock is used to open a demodulation window, wherein the read signal is integrated during the demodulation window. In one embodiment, a plurality of demodulation windows are opened corresponding to the high frequency signal between the sync marks in the spiral tracks, wherein the read signal is integrated during the demodulation windows. In another embodiment, the demodulation window is opened a predetermined interval prior to the head reaching an expected location of a spiral track and a predetermined interval after the head passes an expected location of the spiral track to account for a shift in an actual location of the spiral track.

The present invention may also be regarded as a disk drive comprising a disk having a plurality of spiral tracks, wherein each spiral track comprises a high frequency signal interrupted by a sync mark at a sync mark interval. The disk drive further comprises a head actuated over the disk, and control circuitry for writing a plurality of product servo sectors to the disk to define a plurality of radially spaced, concentric data tracks. The head internal to the disk drive is used to read the spiral tracks to generate a read signal. The read signal is integrated to generate a ramp signal, wherein a position error signal is generated from the ramp signal. The position error signal is used to maintain the head internal to the disk drive along a servo track while writing product servo sectors along the servo track.

BRIEF DESCRIPTION OF THE DRAWINGS

FIG. 6A illustrates an embodiment of the present invention wherein the high frequency signal in the spiral tracks is demodulated by integrating the read signal over a demodulation window and generating the PES relative to a target sync mark and a reference point on the resulting ramp signal.

DESCRIPTION OF THE PREFERRED EMBODIMENTS

Figures 2A, 2B:
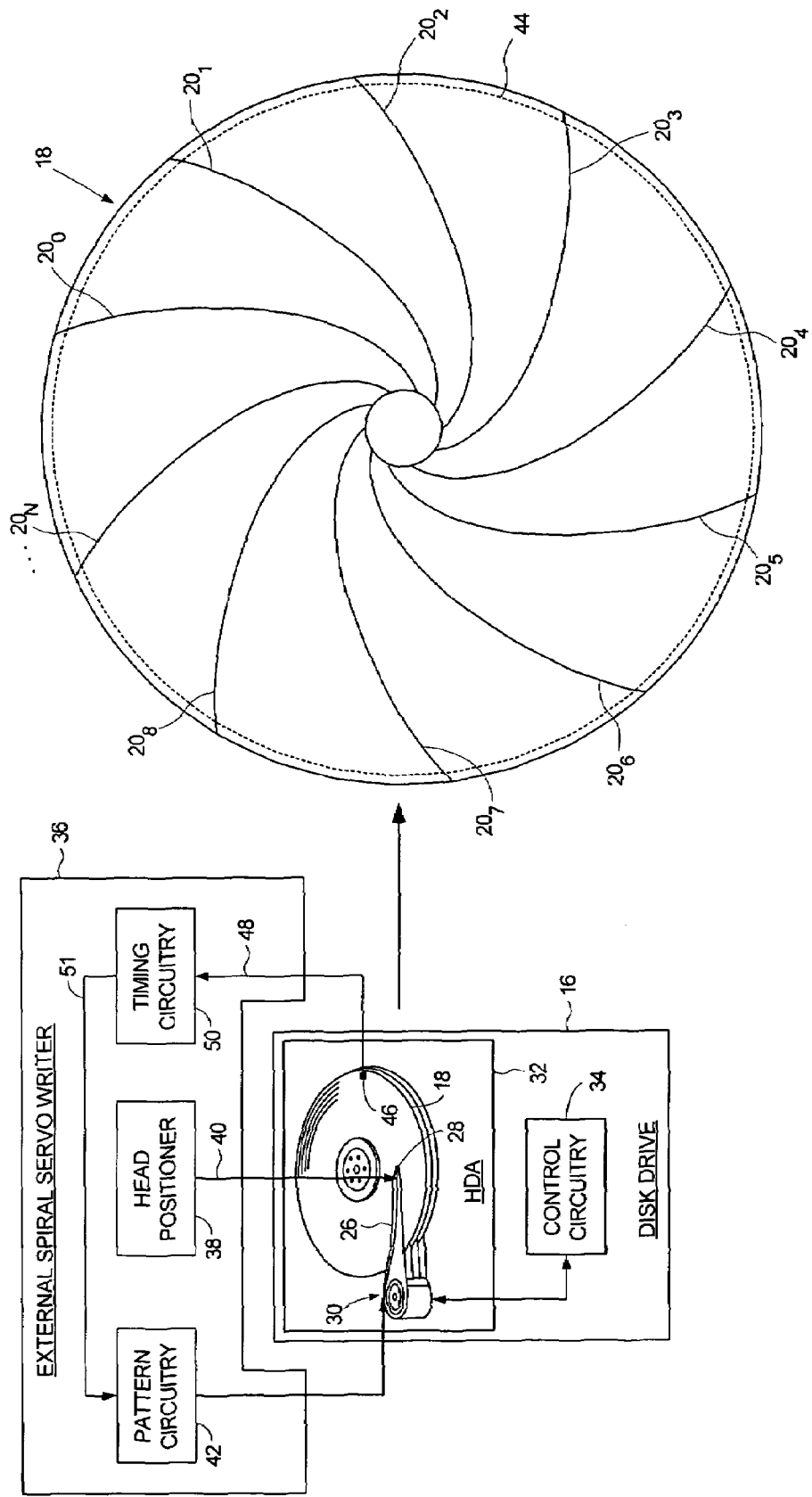
FIGS. 2A and 2B illustrate an embodiment of the present invention wherein an external spiral servo writer is used to write a plurality of spiral tracks to the disk for use in writing product servo sectors to the disk.

FIGS. 2A and 2B show an embodiment of the present invention wherein a plurality of spiral tracks $20_0$-$20_N$ are written to a disk 18 of a disk drive 16 using an external spiral servo writer 36 (in an alternative embodiment, the spiral tracks are stamped onto the disk using magnetic printing techniques). The disk drive 16 comprises control circuitry 34 and a head disk assembly (HDA) 32 comprising the disk 18, an actuator arm 26, a head 28 coupled to a distal end of the actuator arm 26, and a voice coil motor 30 for rotating the actuator arm 26 about a pivot to position the head 28 radially over the disk 18. A write clock is synchronized to the rotation of the disk 18, and the plurality of spiral tracks $20_0$-$20_N$ are written on the disk 18 at a predetermined circular location determined from the write clock. Each spiral track $20_i$ comprises a high frequency signal 22 (FIG. 4B) interrupted by a sync mark 24 at a sync mark interval.

The external spiral servo writer 36 comprises a head positioner 38 for actuating a head positioning pin 40 using sensitive positioning circuitry, such as a laser interferometer. While the head positioner 38 moves the head 28 at a predetermined velocity over the stroke of the actuator arm 26, pattern circuitry 42 generates the data sequence written to the disk 18 for a spiral track 20. The external spiral servo writer 36 inserts a clock head 46 into the HDA 32 for writing a clock track 44 (FIG. 2B) at an outer diameter of the disk 18. The clock head 46 then reads the clock track 44 to generate a clock signal 48 processed by timing recovery circuitry 50 to synchronize the write clock 51 for writing the spiral tracks $20_0$-$20_N$ to the disk 18. The timing recovery circuitry 50 enables the pattern circuitry 42 at the appropriate time relative to the write clock 51 so that the spiral tracks $20_0$-$20_N$ are written at the appropriate circular location. The timing recovery circuitry 50 also enables the pattern circuitry 42 relative to the write clock 51 to write the sync marks 24 (FIG. 4B) within the spiral tracks $20_0$-$20_N$ at the same circular location from the outer diameter to the inner diameter of the disk 18. As described below with reference to FIG. 5, the constant interval between sync marks 24 (independent of the radial location of the head 28) enables the servo write clock to maintain synchronization while writing the product servo sectors to the disk.

Figure 3:
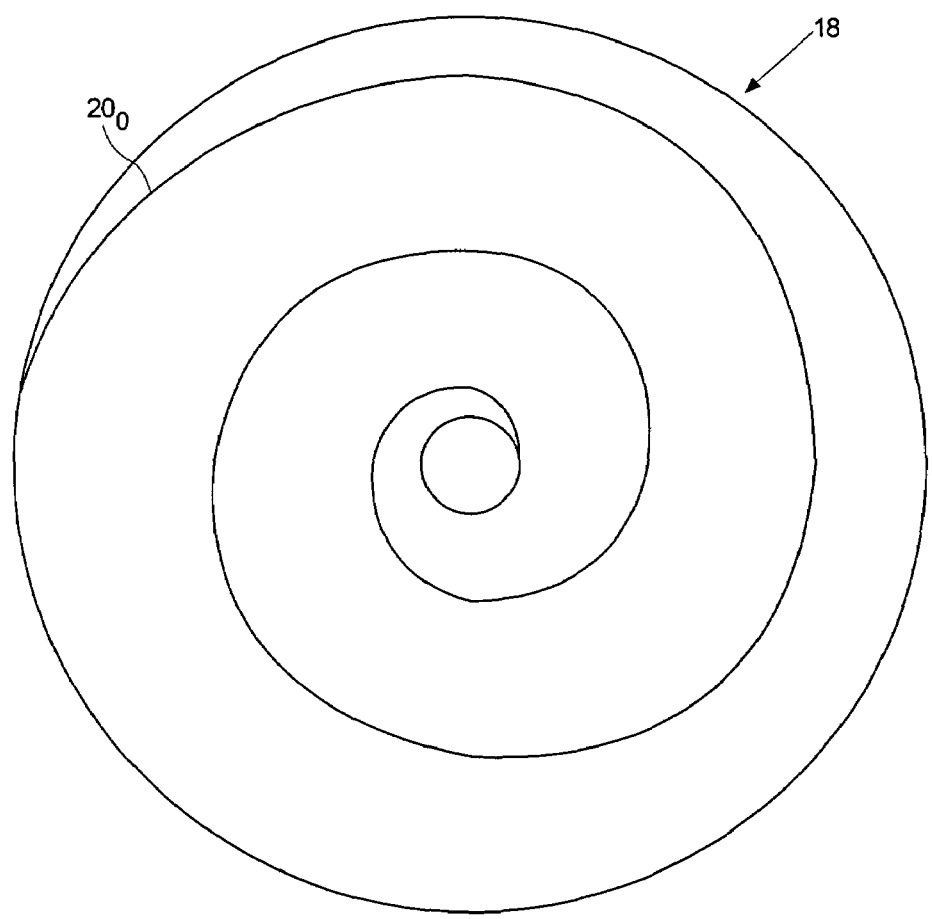
FIG. 3 illustrates an embodiment of the present invention wherein each spiral track is written over multiple revolutions of the disk.

In the embodiment of FIG. 2B, each spiral track $20_i$ is written over a partial revolution of the disk 18. In an alternative embodiment, each spiral track $20_i$ is written over one or more revolutions of the disk 18. FIG. 3 shows an embodiment wherein each spiral track $20_i$ is written over multiple revolutions of the disk 18. In the embodiment of FIG. 2A, the entire disk drive 16 is shown as being inserted into the external spiral servo writer 36. In an alternative embodiment, only the HDA 32 is inserted into the external spiral servo writer 36. In yet another embodiment, an external media writer is used to write the spiral tracks $20_0$-$20_N$ to a number of disks 18, and one or more of the disks 18 are then inserted into an HDA 32.

Referring again to the embodiment of FIG. 2A, after the external spiral servo writer 36 writes the spiral tracks $20_0$-$20_N$ to the disk 18, the head positioning pin 40 and clock head 46 are removed from the HDA 32 and the product servo sectors are written to the disk 18 during a "fill operation". In one embodiment, the control circuitry 34 within the disk drive 16 is used to process the spiral tracks $20_0$-$20_N$ in order to write the product servo sectors to the disk 18. In an alternative embodiment described below with reference to FIGS. 12 and 13, an external product servo writer is used to process the spiral tracks $20_0$-$20_N$ in order to write the product servo sectors to the disk 18.

Figure 4A:
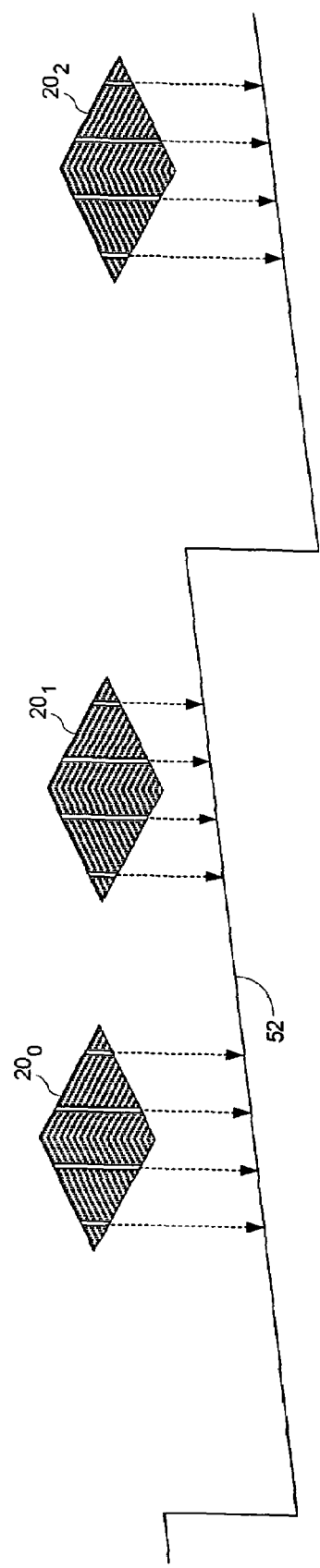
FIG. 4A shows an embodiment of the present invention wherein a servo write clock is synchronized by clocking a modulo-N counter relative to when the sync marks in the spiral tracks are detected.
Figure 4B:
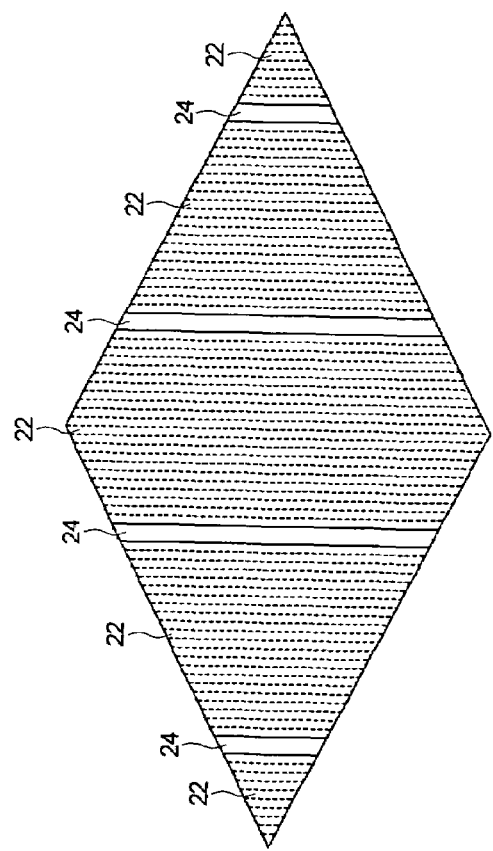
FIG. 4B shows an eye pattern generated by reading the spiral track, including the sync marks in the spiral track.

FIG. 4B illustrates an "eye" pattern in the read signal that is generated when the head 28 passes over a spiral track 20. The read signal representing the spiral track comprises high frequency transitions 22 interrupted by sync marks 24. When the head 28 moves in the radial direction, the eye pattern will shift (left or right) while the sync marks 24 remain fixed. The shift in the eye pattern (detected from the high frequency signal 22) relative to the sync marks 24 provides the off-track information (position error signal or PES) for servoing the head 28.

FIG. 4A shows an embodiment of the present invention wherein a saw-tooth waveform 52 is generated by clocking a modulo-N counter with the servo write clock, wherein the frequency of the servo write clock is adjusted until the sync marks 24 in the spiral tracks $20_0$-$20_N$ are detected at a target modulo-N count value. The servo write clock may be generated using any suitable circuitry, such as a phase locked loop (PLL). As each sync mark 24 in the spiral tracks $20_0$-$20_N$ is detected, the value of the modulo-N counter represents the phase error for adjusting the PLL. In one embodiment, the PLL is updated when any one of the sync marks 24 within the eye pattern is detected. In this manner the multiple sync marks 24 in each eye pattern (each spiral track crossing) provides redundancy so that the PLL is still updated if one or more of the sync marks 24 are missed due to noise in the read signal. Once the sync marks 24 are detected at the target modulo-N counter values, the servo write clock is coarsely locked to the desired frequency for writing the product servo sectors to the disk 18.

Figure 1:
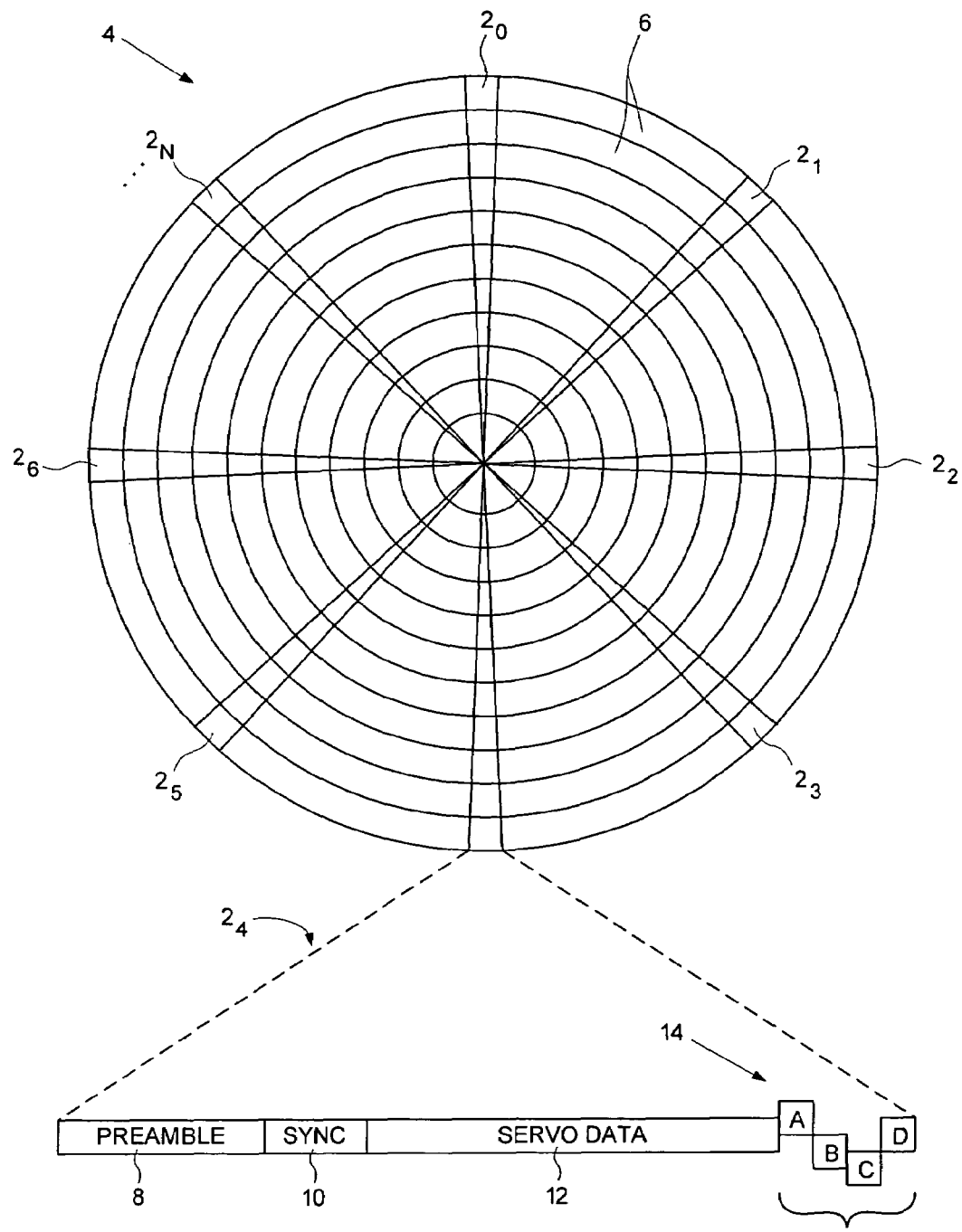
FIG. 1 shows a prior art disk format comprising a plurality of radially spaced, concentric tracks defined by a plurality of product servo sectors.

The sync marks 24 in the spiral tracks 20$_0$-20$_N$ may comprise any suitable pattern, and in one embodiment, a pattern that is substantially shorter than the sync mark 10 in the conventional product servo sectors 2 of FIG. 1. A shorter sync mark 24 allows the spiral tracks 20$_0$-20$_N$ to be written to the disk 18 using a steeper slope (by moving the head faster from the outer diameter to the inner diameter of the disk 18), which reduces the time required to write each spiral track 20$_0$-20$_N$.

In one embodiment, the servo write clock is further synchronized by generating a timing recovery measurement from the high frequency signal 22 between the sync marks 24 in the spiral tracks 20$_0$-20$_N$. Synchronizing the servo write clock to the high frequency signal 22 helps maintain proper radial alignment (phase coherency) of the Gray coded track addresses in the product servo sectors. The timing recovery measurement may be generated in any suitable manner. In one embodiment, the servo write clock is used to sample the high frequency signal 22 and the signal sample values are processed to generate the timing recovery measurement. The timing recovery measurement adjusts the phase of the servo write clock (PLL) so that the high frequency signal 22 is sampled synchronously. In this manner, the sync marks 24 provide a coarse timing recovery measurement and the high frequency signal 22 provides a fine timing recovery measurement for maintaining synchronization of the servo write clock.

Figure 5:
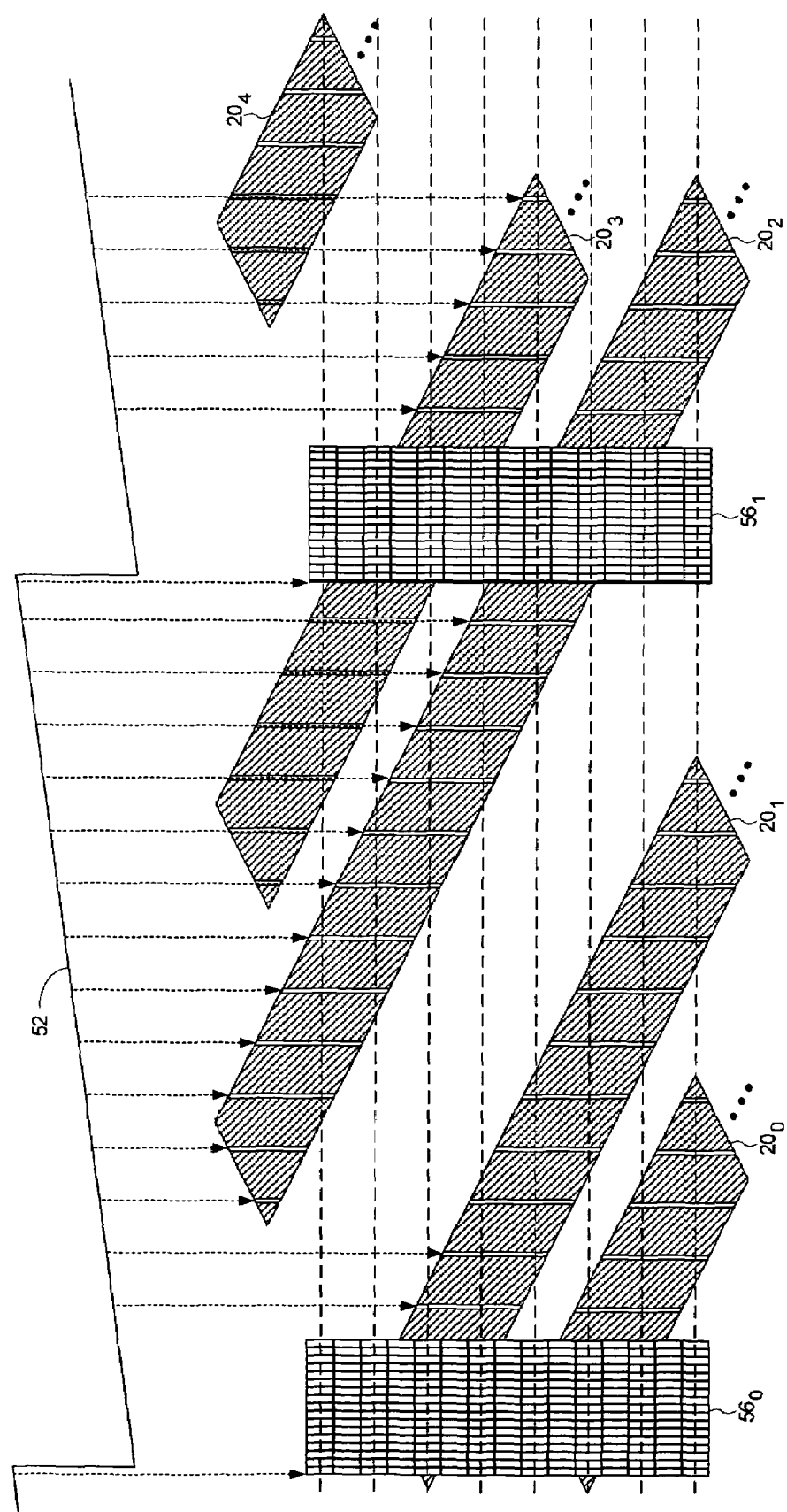
FIG. 5 illustrates writing of product servo sectors using a servo write clock generated from reading the spiral tracks.

FIG. 5 illustrates how the product servo sectors 56$_0$-56$_N$ are written to the disk 18 after synchronizing the servo write clock in response to the high frequency signal 22 and the sync marks 24 in the spiral tracks 20$_0$-20$_N$. In the embodiment of FIG. 5, the dashed lines represent the centerlines of the data tracks. The sync marks in the spiral tracks 20$_0$-20$_N$ are written so that there is a shift of two sync marks 24 in the eye pattern (FIG. 4B) between data tracks. In an alternative embodiment, the sync marks 24 in the spiral tracks 20$_0$-20$_N$ are written so that there is a shift of N sync marks in the eye pattern between data tracks. In the embodiment of FIG. 5, the data tracks are narrower than the spiral tracks 20, however, in an alternative embodiment the data tracks are wider than or proximate the width of the spiral tracks 20.

Once the head 28 is tracking on a servo track, the product servo sectors 56$_0$-56$_N$ are written to the disk using the servo write clock. Write circuitry is enabled when the modulo-N counter reaches a predetermined value, wherein the servo write clock clocks the write circuitry to write the product servo sector 56 to the disk. The spiral tracks 20$_0$-20$_N$ on the disk are processed in an interleaved manner to account for the product servo sectors 56$_0$-56$_N$ overwriting a spiral track. For example, when writing the product servo sectors 56$_1$ to the disk, spiral track 20$_2$ is processed initially to generate the PES tracking error and the timing recovery measurement. When the product servo sectors 56$_1$ begin to overwrite spiral track 20$_2$, spiral track 20$_3$ is processed to generate the PES tracking error and the timing recovery measurement. In the embodiment of FIG. 5, the spiral tracks 20 are written as pairs to facilitate the interleave processing; however, the spiral tracks may be written using any suitable spacing (e.g., equal spacing) while still implementing the interleaving aspect.

Figure 6B:
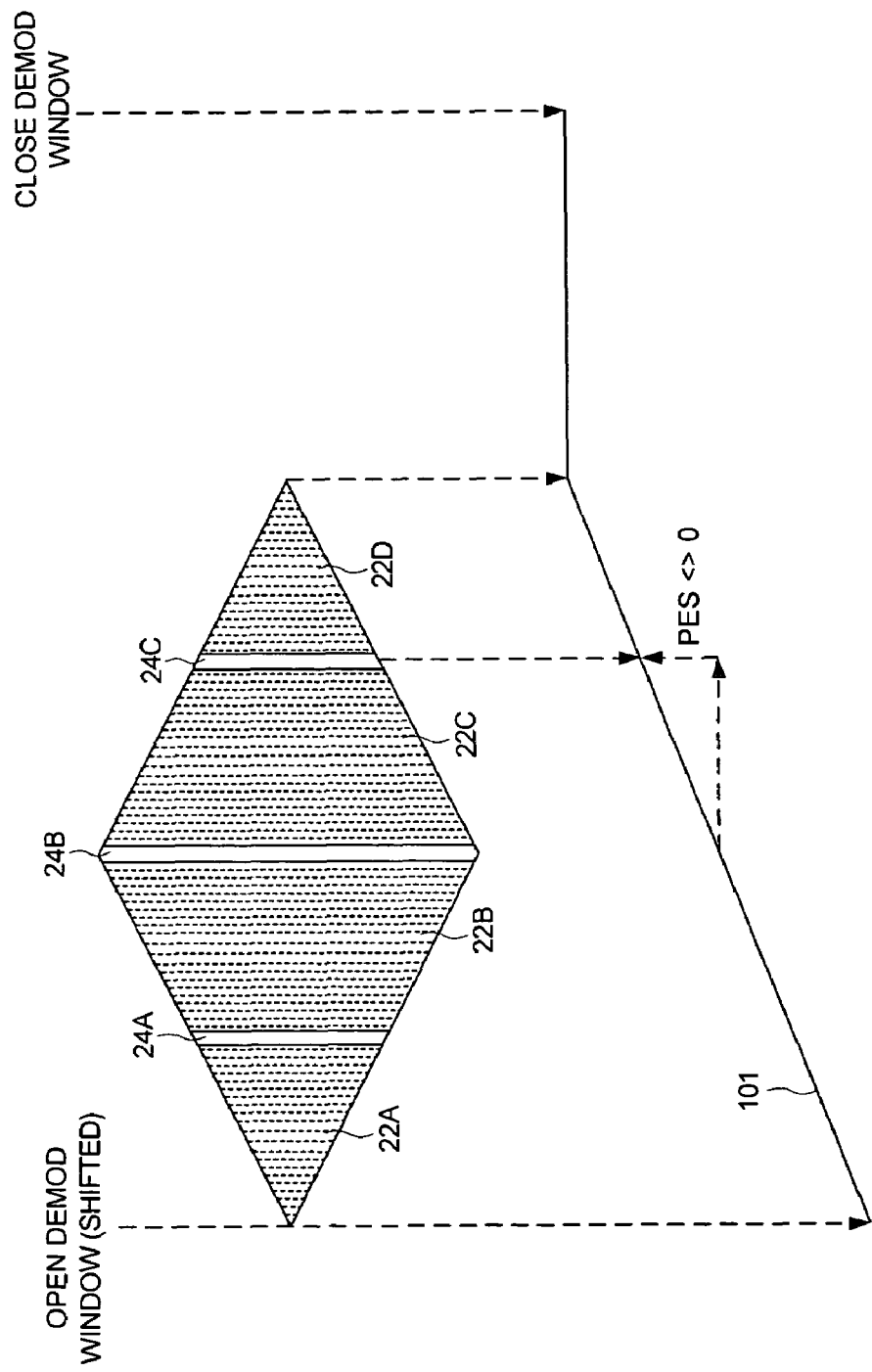
FIG. 6B illustrates initiating a seek operation by shifting the demodulation window an integer number of sync marks to generate a non-zero PES.

FIG. 6A shows an embodiment of the present invention wherein the high frequency signal 22 in a spiral track 20 is demodulated by integrating the read signal to generate a ramp signal 101. The PES is generated relative to a target sync mark 24 in the spiral track 20 and a reference point of the ramp signal 101. In the embodiment of FIG. 6A, there are three sync marks 24A-24C in each spiral track crossing (each eye pattern) and the PES is generated as the deviation of the middle sync mark 24B from the center of the ramp signal 101. This deviation can be computed as the difference in the amplitude of the ramp signal 101 when the middle sync mark 24B is detected, or the difference in time between when the middle sync mark 24B is detected and the middle of the ramp signal 101. Also in this embodiment, the demodulation window is opened a number of sync mark intervals preceding the expected spiral track crossing (one sync mark interval in this example) and closed a number of sync mark intervals after the expected spiral track crossing (one sync mark interval in this example). In one embodiment, the ramp signal 101 is generated by integrating the high frequency signal 22 between the sync marks 24; that is, integration windows within the demodulation window are generated corresponding to the segments of high frequency signal 22 between each sync mark 24 (as determined from servo write clock 66). FIG. 6B illustrates a seek operation by shifting the demodulation window one sync mark interval to generate a non-zero PES which causes the head 28 to move toward the next servo track. The head 28 is moved radially so that the eye pattern shifts until sync mark 24C is detected in the middle of the eye pattern corresponding to the middle of the ramp signal 101.

Figure 7:
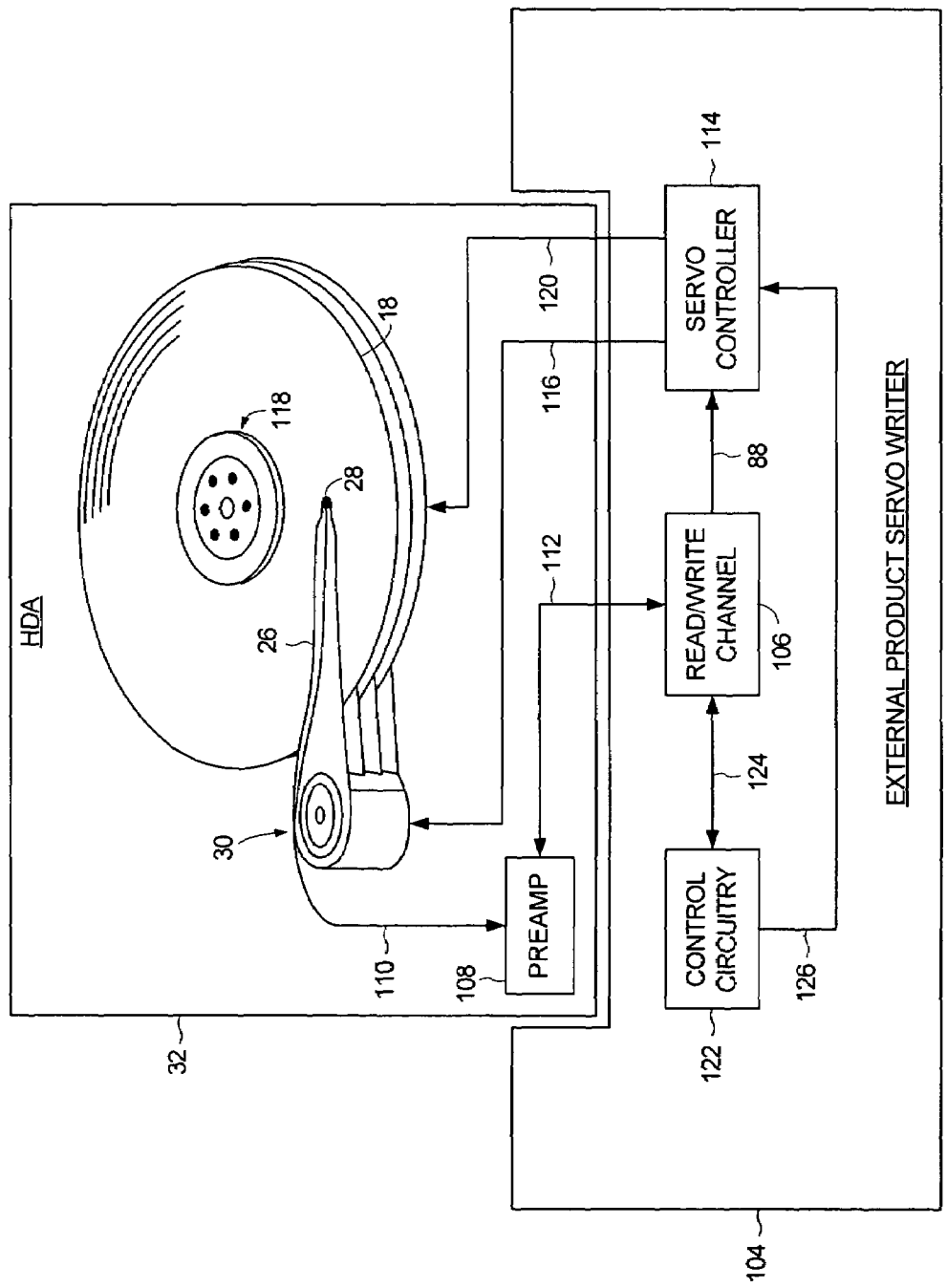
FIG. 7 shows an embodiment of the present invention wherein an external product servo writer is used to process the spiral tracks in order to write the product servo sectors to the disk.
Figure 8:
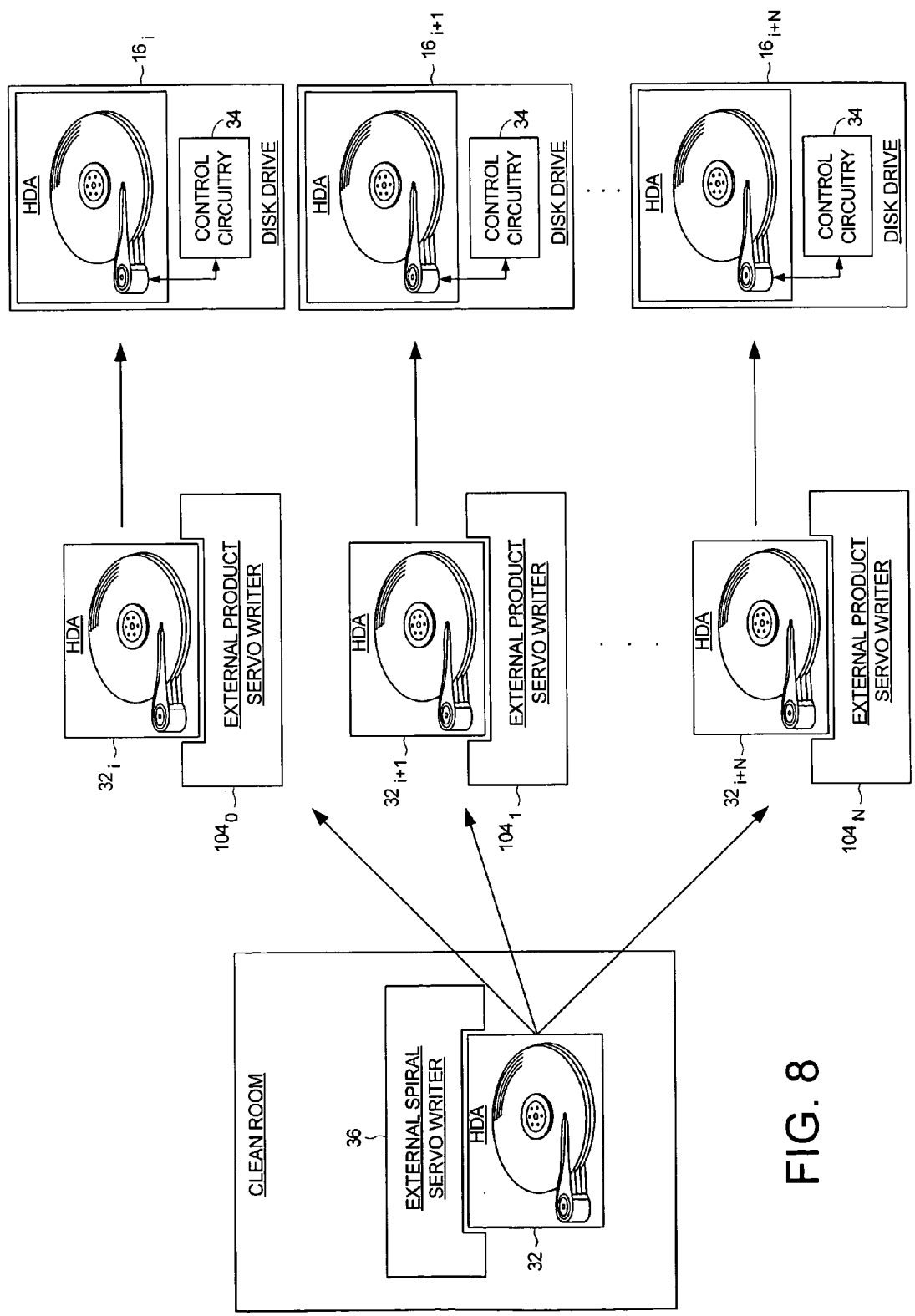
FIG. 8 shows an embodiment of the present invention wherein an external spiral servo writer is used to write the spiral tracks, and a plurality of external product servo writers write the product servo sectors for the HDAs output by the external spiral servo writer.
Figure 9:
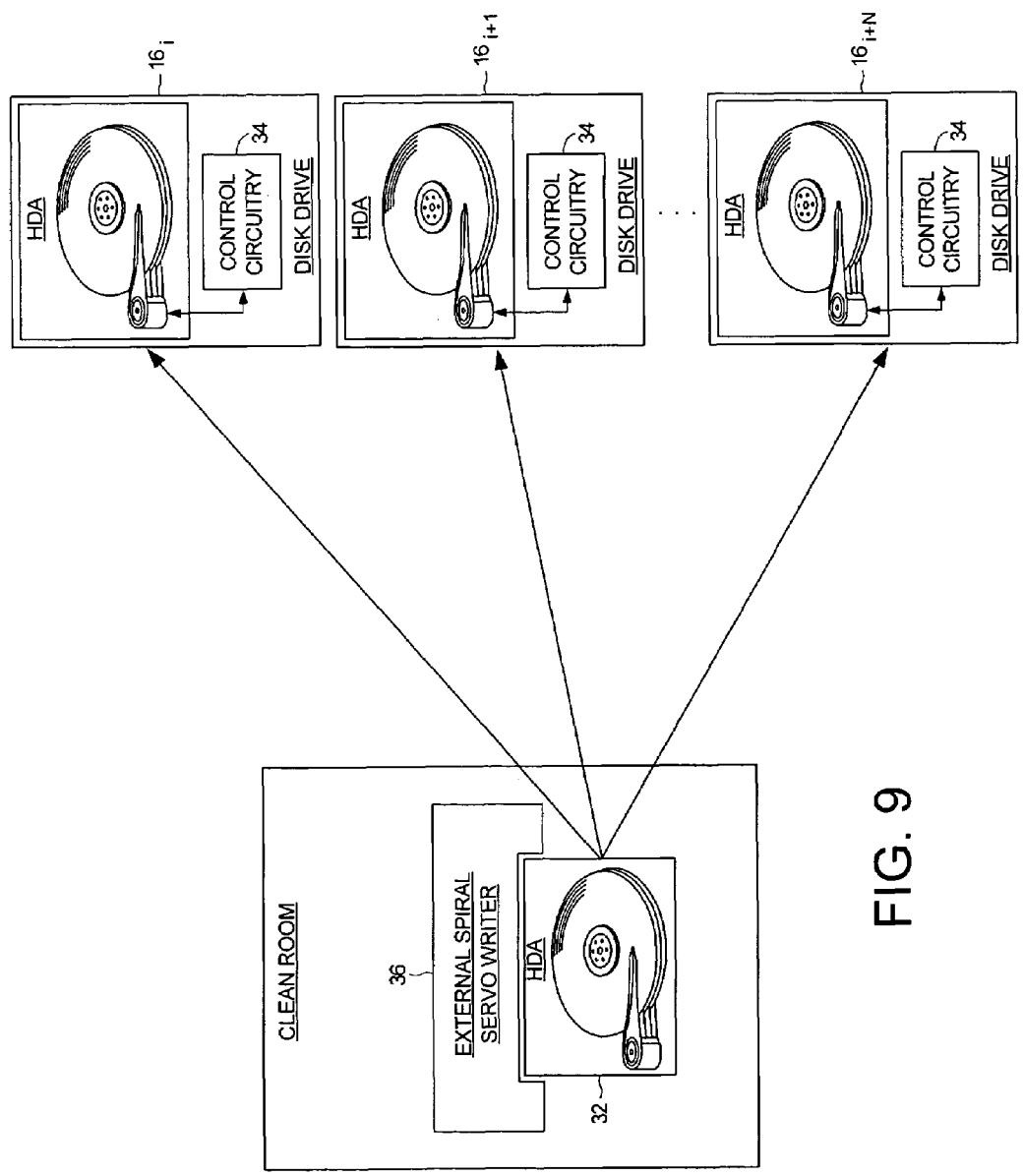
FIG. 9 shows an embodiment of the present invention wherein an external spiral servo writer is used to write the spiral tracks, and the control circuitry within each product disk drive is used to write the product servo sectors.

FIG. 7 shows an embodiment of the present invention wherein after writing the spiral tracks 20$_0$-20$_N$ to the disk 18 (FIGS. 2A-2B), the HDA 32 is inserted into an external product servo writer 104 comprising suitable circuitry for reading and processing the spiral tracks 20$_0$-20$_N$ in order to write the product servo sectors 56$_0$-56$_N$ to the disk 18. The external product servo writer 104 comprises a read/write channel 106 for interfacing with a preamp 108 in the HDA 32. The preamp 108 amplifies a read signal emanating from the head 28 over line 110 to generate an amplified read signal applied to the read/write channel 106 over line 112. The read/write channel 106 comprises circuitry for generating servo burst signals 88 applied to a servo controller 114. The servo controller 114 processes the servo burst signals 88 to generate the PES. The PES is processed to generate a VCM control signal applied to the VCM 30 over line 116 in order to maintain the head 28 along a circular path while writing the product servo sectors 56$_0$-56$_N$. The servo controller 114 also generates a spindle motor control signal applied to a spindle motor 118 over line 120 to maintain the disk 18 at a desired angular velocity. Control circuitry 122 processes information received from the read/write channel 106 over line 124 associated with the spiral tracks 20$_0$-20$_N$ (e.g., timing information) and provides the product servo sector data to the read/write channel 106 at the appropriate time. The product servo sector data is provided to the preamp 108 which modulates a current in the head 28 in order to write the product servo sectors 56$_0$-56$_N$ to the disk 18. The control circuitry 122 also transmits control information over line 126 to the servo controller 114 such as the target servo track to be written. After writing the product servo sectors 56$_0$-56$_N$ to the disk 18, the HDA 32 is removed from the external product servo writer 104 and a printed circuit board assembly (PCBA) comprising the control circuitry 34 (FIG. 2A) is mounted to the HDA 32.

In one embodiment, the external product servo writer 104 of FIG. 7 interfaces with the HDA 32 over the same connections as the control circuitry 34 to minimize the modifications needed to facilitate the external product servo writer 104. The external product servo writer 104 is less expensive than a conventional servo writer because it does

We claim:

1. A method of writing product servo sectors to a disk of a disk drive, the disk drive comprising control circuitry and a head disk assembly (HDA) comprising the disk, an actuator arm, a head coupled to a distal end of the actuator arm, and a voice coil motor for rotating the actuator arm about a pivot to position the head radially over the disk, the disk comprising a plurality of spiral tracks, wherein each spiral track comprises a high frequency signal interrupted by a sync mark at a sync mark interval, the method comprising the steps of:
   (a) using the head internal to the disk drive to read the spiral tracks to generate a read signal;
   (b) integrating the read signal to generate a ramp signal representing a spiral track crossing;
   (c) generating a position error signal in response to the ramp signal, wherein the position error signal is generated relative to a difference between a target amplitude at the reference point of the ramp signal and an actual amplitude of the ramp signal when the target sync mark is detected;
   (d) using the position error signal to maintain the head internal to the disk drive along a servo track while writing product servo sectors along the servo track.

2. The method as recited in claim 1, wherein the position error signal is generated relative to a target sync mark in a spiral track and a reference point of the ramp signal.

3. The method as recited in claim 1, further comprising the step of processing the read signal to detect the sync marks in the spiral tracks in order to synchronize a servo write clock.

4. The method as recited in claim 3, further comprising the step of using the servo write clock to open a demodulation window, wherein the read signal is integrated during the demodulation window.

5. The method as recited in claim 4, wherein the step of opening a demodulation window comprises the step of using the servo write clock to open a plurality of demodulation windows corresponding to the high frequency signal between the sync marks in the spiral tracks, wherein the read signal is integrated during the demodulation windows.

6. The method as recited in claim 4, wherein the demodulation window is opened a predetermined interval prior to the head reaching an expected location of a spiral track to account for a shift in an actual location of the spiral track.

7. The method as recited in claim 4, wherein the demodulation window is closed a predetermined interval after the head passes an expected location of a spiral track to account for a shift in an actual location of the spiral track.

8. A disk drive comprising:
   (a) a disk comprising a plurality of spiral tracks, wherein each spiral track comprises a high frequency signal interrupted by a sync mark at a sync mark interval;
   (b) a head actuated over the disk; and
   (c) control circuitry for writing a plurality of product servo sectors to the disk to define a plurality of radially spaced, concentric data tracks by:
      using the head internal to the disk drive to read the spiral tracks to generate a read signal;
      integrating the read signal to generate a ramp signal representing a spiral track crossing;
      generating a position error signal in response to the ramp signal, wherein the control circuitry generates the position error signal relative to a difference between a target amplitude at the reference point of the ramp signal and an actual amplitude of the ramp signal when the target sync mark is detected;
      using the position error signal to maintain the head internal to the disk drive along a servo track while writing product servo sectors along the servo track.

9. The disk drive as recited in claim 8, wherein the position error signal is generated relative to a target sync mark in a spiral track and a reference point of the ramp signal.

10. The disk drive as recited in claim 8, wherein the control circuitry processes the read signal to detect the sync marks in the spiral tracks in order to synchronize a servo write clock.

11. The disk drive as recited in claim 10, wherein the control circuitry uses the servo write clock to open a demodulation window, wherein the read signal is integrated during the demodulation window.

12. The disk drive as recited in claim 11, wherein the control circuitry uses the servo write clock to open a plurality of demodulation windows corresponding to the high frequency signal between the sync marks in the spiral tracks, wherein the read signal is integrated during the demodulation windows.

13. The disk drive as recited in claim 11, wherein the demodulation window is opened a predetermined interval prior to the head reaching an expected location of a spiral track to account for a shift in an actual location of the spiral track.

14. The disk drive as recited in claim 11, wherein the demodulation window is closed a predetermined interval after the head passes an expected location of a spiral track to account for a shift in an actual location of the spiral track.

* * * * *